United States Patent [19]
Brocia et al.

[11] Patent Number: 5,331,327
[45] Date of Patent: Jul. 19, 1994

[54] RADAR DETECTOR PERFORMANCE VERIFICATION METHOD AND APPARATUS

[76] Inventors: Robert W. Brocia, 15 Moore Rd., Bronxville, N.Y. 10708; Marie Dagata, 406 E. Ninth St., Apt. 12A, New York, N.Y. 10009

[21] Appl. No.: 1,029

[22] Filed: Jan. 6, 1993

Related U.S. Application Data

[63] Continuation-in-part of Ser. No. 845,588, Mar. 4, 1992, Pat. No. 5,191,348.

[51] Int. Cl.⁵ .................................................. G01S 7/40
[52] U.S. Cl. ........................................ 342/173; 342/20
[58] Field of Search ......................... 342/173, 20, 165

[56] References Cited

U.S. PATENT DOCUMENTS

| | | | |
|---|---|---|---|
| 3,295,130 | 12/1966 | Prestwood | 342/165 |
| 3,683,376 | 8/1972 | Pronovost | 342/28 |
| 4,182,990 | 1/1980 | Coffin et al. | 340/600 |
| 5,122,802 | 6/1992 | Marin | 342/13 |
| 5,191,348 | 3/1993 | Brocia et al. | 342/173 |

OTHER PUBLICATIONS

Eight Triband Radar Detectors in Car Audio Magazine, Mar. 1991, vol. 4, No. 3 pp. 92-103.

Radar Detector Tester in Radio Electronics, Feb. 1990, vol. 61, No. 2, pp. 37-38.

Owner's Manual, Passport Radar Receiver, 1989, by Cincinnati Microwave, Inc., pp. 32-33.

Owner's Manual, Bel Vector Radar Detector by Bel--Tronics, Ltd. Radar Speed-Gun Controller in Radio Electronics, Aug. 1986, vol. 57, No. 8, pp. 39-42 and 85.

Radar Signal Detector in Radio Electronics, Jul. 1986, vol. 57, No. 7, pp. 52, 97.

Primary Examiner—John B. Sotomayor
Attorney, Agent, or Firm—Ohlandt, Greeley & Ruggiero

[57] ABSTRACT

A frequency transmitter apparatus for testing a radar detector is provided that comprises a housing having three sections each with an outer surface. The three sections are configured so that the outer surface of each is directed away from the other two outer surfaces. A frequency transmitter is mounted on each section. The apparatus further comprising a device for receiving voltage from a voltage source to power the transmitter, a voltage indicator for monitoring voltage from the voltage source, and a switch for connecting the voltage indicator and the three transmitters to the receiving device. Each section shields the housing from the frequency from each of the three transmitters. The apparatus may, preferably, include a switch-selectable frequency feature.

50 Claims, 8 Drawing Sheets

RADAR DETECTOR PERFORMANCE VERIFICATION METHOD AND APPARATUS

RELATED APPLICATION

This application is a continuation-in-part of application Ser. No. 07/845,588, filed Mar. 4, 1992, now U.S. Pat. No. 5,191,348.

BACKGROUND OF THE INVENTION

1. Field of the Invention

This invention relates to the field of radio receiver and transmitter calibration and testing equipment and, more particularly, to an apparatus and a method for testing police band radar detectors that are capable of detecting microwave transmitters of the type used for automobile speed measurement.

2. Description of the Prior Art

Heretofore, there has not been a reliable and practical performance verification method or apparatus for testing a police radar detecting device.

The following prior art publications deal with the technology of radar detection: an article entitled "Eight Triband Radar Detectors" in Car Audio Magazine, March 1991, Vol. 4, No. 3, pages 92–103; an article entitled "Radar Detector Tester" in Radio Electronics, February 1990, Vol. 61, No. 2, pages 37–38; Owner's Manual, Passport Radar Receiver, 1989, by Cincinnati Microwave, Inc., pages 32–33; Owner's Manual, Bel Vector Radar Detector by Bel-Tronics Ltd. (copyright unknown); an article entitled "Radar Speed-Gun Controller" in Radio Electronics, August 1986, Vol. 57, No. 8, pages 39–42 and 85; and an article entitled "Radar Signal Detector" in Radio Electronics, July 1986, Vol. 57, No. 7, pages 52, 97.

The article entitled "Eight Triband Radar Detectors" in Car Audio Magazine evaluates the performance of several radar detectors on the X, K, and Ka bands utilizing police speed measurement equipment. This method, which employs a police radar gun, is impractical and prohibitively expensive for routine testing of radar detectors. The article states that radar detector malfunction is not an unusual occurrence. Thus, the need for a reliable method and apparatus to verify radar detector performance is underscored.

The article entitled "Radar Detector Tester" in Radio Electronics provides a method and apparatus for comparing radar receiving sensitivity between two radar detectors. This method and apparatus, however, is used to determine a relative sensitivity. Furthermore, it is believed, apparently due to signal strength, that the operator must leave the automobile in order to effect a change in the field strength meter of the radar detector. Thus, performance verification may not be implemented while the radar detector is in use. It is also believed that this apparatus would transmit at power levels in violation of present U.S. regulatory laws and policies.

The Passport Radar Receiver in the Owner's Manual provides a method that includes an averaging technique of false signals. This method, however, requires the presence of routinely encountered false signals on a regular route and is claimed to be a semi-reliable method by this reference. Additionally, this method will not test the performance of signals used exclusively for police band radar.

The article entitled "Radar Speed-Gun Controller" in Radio Electronics provides an apparatus for testing and calibrating speed measurement equipment in the laboratory. The apparatus, also known as a radar jammer, interferes with police radar and, therefore, is in violation of present U.S. regulatory laws and policies.

The article entitled "Radar Signal Detector" in Radio Electronics provides an apparatus to test a radar signal detector by the generation of a non-specific broadband radio frequency signal. An RF signal, such as that derived from the cited apparatus, is also believed to be in violation of present U.S. regulatory laws and policies.

The Bel Vector Owner's Manual by Bel-Tronics Ltd. provides an imprecise method to test radar detectors that includes the use of false signals as a performance indicator.

The present invention is particularly suited for an individual who is untrained in the field of electronics for the purpose of performing a simple, rapid and accurate test to determine whether radar detection equipment is functioning. By the present invention, the performance of the radar detector is tested by using a single apparatus. The apparatus uses the minimal amount of radio frequency (R.F.) power output that is necessary to accomplish the task. In addition, the radar detector can be tested while the radar detector is in use.

Further, the present apparatus transmits at three different frequencies so that all police radar band reception of the radar detector can be tested.

None of the above citations achieves or fulfills the purposes of the apparatus and method of the present invention.

SUMMARY OF THE PRESENT INVENTION

It is a principal object of the present invention to provide a method and apparatus that can be used by individuals untrained in the field of electronics for the purpose of determining the operational status of a radar detector.

It is another object of the present invention to provide such an apparatus and method that determines the operational status of a radar detector on all frequencies used by the detector.

It is still another object of the present invention to provide such an apparatus and method that will test the radar detector while the detector is in use.

It is a further object of the present invention that such an apparatus and method will not interfere with equipment operating on the same frequencies.

It is a still further object of the present invention to provide a low-power transmitter capable of transmitting signals at all police radar frequencies for testing the receiver section and alerting circuitry of a radar detector.

It is yet a still further object of the present invention to provide such an apparatus and method that have a placement procedure to maintain a desired relative physical relationship between the radar detector to be tested and the apparatus to maintain a constant field strength for any given signal value that is transmitted.

To the accomplishment of the foregoing objects and advantages, the present invention, in brief summary, comprises an apparatus for testing a radar detector. The apparatus comprises: a housing having three sections each with an outer surface. Each of the three sections is configured so that the outer surface of each is directed away from the other two surfaces. Each of the three transmitters is mounted on a different one of the three sections in the housing. The apparatus further comprising means for receiving energy from an energy source to power the transmitter, voltage indicator means for monitoring voltage of the energy source, and switch means for connecting the voltage indicator means and the transmitter to the receiving means. Each section shields the housing from the frequency from each of the three transmitters.

The present invention also providing a switch-selectable frequency transmitter that comprises: means for supplying voltage; a plurality of switches each operatively connected to the voltage supplying means; a plurality of indicators each operatively connected to a different one of the plurality of switches; a plurality of potentiometers each operatively connected to a different one of the plurality of indicators; a plurality of oscillators each operatively connected to a different one of the plurality of potentiometers, wherein each potentiometer supplies voltage to its respective oscillator, and a plurality of microstrips each operatively connected to a different one of the plurality of oscillators. The switch-selectable frequency transmitter may include a plurality of activating means each connected to a different one of the plurality of switches to activate the switch.

BRIEF DESCRIPTION OF THE DRAWINGS

The foregoing and still the objects and advantages of the present invention will be more apparent from the following detailed explanation of the preferred embodiments of the present invention in connection with the accompanying drawings wherein.

DESCRIPTION OF THE PREFERRED EMBODIMENTS

Figure 1:
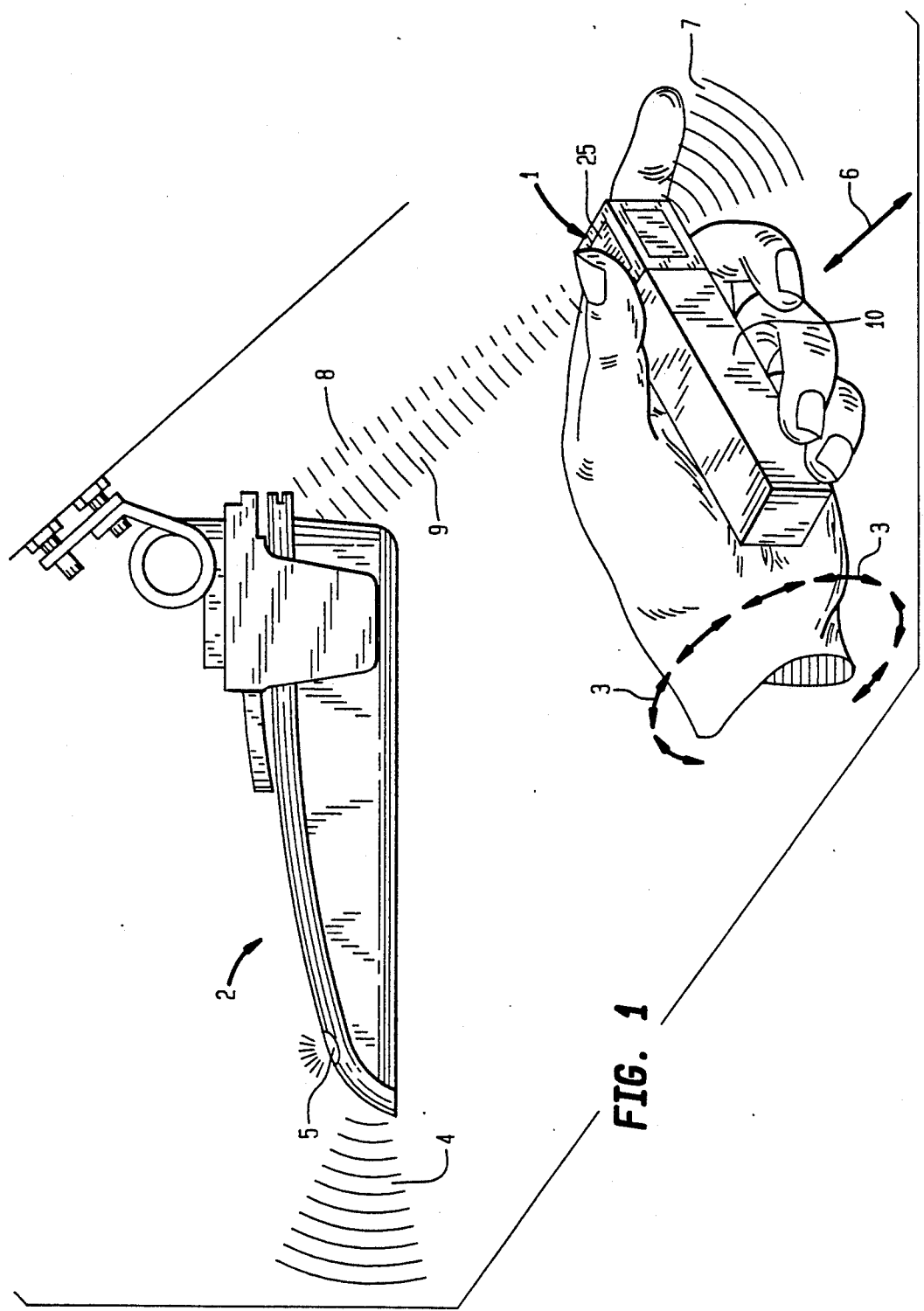
FIG. 1 is a diagrammatic, side view, of a preferred embodiment of the apparatus of the present invention.

Referring to the drawings and, in particular, FIG. 1, a transmitter or transmitter apparatus of the present invention is generally represented by reference numeral 1. The transmitter apparatus 1 is, preferably, a handheld, electromagnetic field transmitter apparatus. The transmitter apparatus 1 has a housing or body 10.

Figure 3:
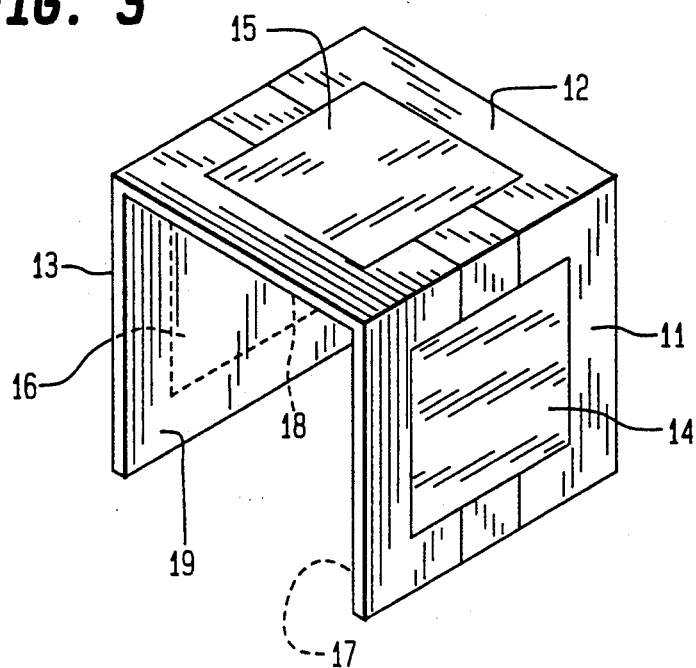
FIG. 3 is a diagrammatic, exploded view of the housing or body included in the apparatus of FIG. 1.

As shown in FIG. 3, the body has, either as its body shell or surface, or on the inside immediately adjacent its body shell, three sections 11, 12 and 13. The three sections 11, 12 and 13 are configured such that the outer faces or surfaces 14, 15 and 16, respectively, of each section is directed away from the other two sections. In a preferred embodiment, sections 11 and 13 are parallel to but spaced from each other. They are separated or spaced from each other by section 12 that is positioned perpendicular to sections 11 and 13 and is connected to an edge of each to form a U-shape. In a preferred embodiment, sections 11, 12 and 13 are formed from one substrate.

The outer surfaces 14, 15 and 16 of sections 11, 12 and 13, respectively, are the surfaces that face outward so that each is directed away from the other two surfaces. Alternatively, the sections 11, 12 and 13 could be arranged or configured as an equilateral triangle. The configuration of the sections 11, 12 and 13 is selected so that each outer surface 14, 15 and 16 will allow radio frequency energy to be directed away from each section and, thus, also away from the other two outer surfaces.

Each section 11, 12 and 13 is made of a double-sided, conductive circuit board material. Each section 11, 12 and 13 has the outer surface 14, 15 and 16, respectively, on which the components that comprise the transmitter apparatus 1 in FIG. 1 are mounted. The components are, preferably, mounted on the surface or body shell of the body. Alternatively, a skin coat of cover material, such as plastic, can be formed over the components and body shell provided the skin coat does not affect the performance of the components. The body has three inside or interior surfaces 17, 18 and 19 one for each of the three sections 11, 12 and 13. Each inside surface 17, 18 and 19 is made of copper or a similar conductive material that would be supplied with commercially available double-sided circuit boards.

The transmitter apparatus 1 includes on each section 11, 12 and 13, an oscillator and an antennae. In addition, each section 11, 12 and 13 may include conventional amplifiers or enhancements (not shown) that would serve to increase the transmitter's signal strength or increase the transmitter signal frequency or both. The term antennae includes any means of radiating energy through space intended to generate a response from a radar detector.

Figure 2:
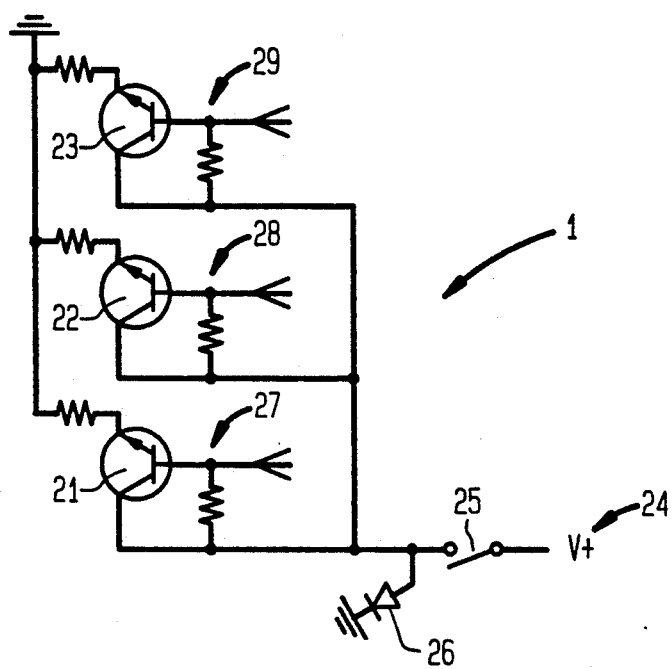
FIG. 2 is a circuit diagram of a transmitter circuit suitable for use in the apparatus of FIG. 1.

The components of the transmitter apparatus 1 are mounted, as shown in the schematic of FIG. 2, such that each oscillator and antennae, namely oscillator 21, 22 and 23 together with each antenna 27, 28 and 29, are on a separate outside surface 14, 15 and 16 of each section 11, 12 and 13, respectively, of the circuit board material. Thus, the outside surface 14 of section 11 includes oscillator 21 and antenna 27, the outside surface 15 of section 12 includes oscillator 22 and antenna 28, while the outside surface 16 of section 13 includes oscillator 23 and antenna 29.

Each oscillator 21, 22 and 23 provides frequency to measure one of the three police bands, namely the X, K and Ka bands. At present, the X band has a bandwidth of 110 MHz center 10.525 GHz (10.470 to 10.580 GHz), the K band has a bandwidth of 200 MHz center 24.15 GHz (24.050 to 24.250 GHz), and the Ka band has a bandwidth of 200 MHz center 34,300 GHz (34.200 to 34,400 GHz) (and a wide-band Ka band has a bandwidth of 1000 MHz center 34,700 GHz).

Referring to FIG. 2, a power supply 24 is provided to activate the transmitter apparatus. The power supply 24 may be any suitable power supply capable of supplying the power required to operate the high frequency needed for the transmitter apparatus and, in a preferred embodiment, a voltage indicator 26 that is part of the transmitter apparatus. It will be appreciated by those skilled in the art that the power supply 24 can be derived from either a DC source, such as a battery or an automotive electrical system, or a conventional 117 volt AC power source. Such power supply 24 and circuitry is well known to those skilled in the electronics field. The voltage from the power supply 24 is supplied via a switch 25 to the transmitter apparatus 1 and the voltage indicator 26. The outputs of the three oscillators 21, 22 and 23 of the transmitter apparatus 1 are operatively connected to antennas 27, 28, and 29, respectively. The voltage indicator 26 includes a light emitting diode that alerts the operator of the transmitter apparatus 1 if power supply voltage is weak thereby affecting the integrity of transmitter field strength.

If three oscillators are used, each is tuned to a different frequency, namely the X, K and Ka band frequencies, that is detectable by the radar detector 2. The mounted components radiate electromagnetic energy from outer surfaces 14, 15, and 16. By the preferred U-shape or triangular arrangement or configuration of the oscillator and section components, the conductive inside coverings provided by the double side circuit board material used in sections 11, 12 and 13 provide shielded planes for each frequency transmitted even as the transmitter apparatus 1 is rotated in a clockwise or counter-clockwise direction. With this configuration, the transmitter apparatus 1 will shield two transmitted frequencies from the radar detector 2 while directing one frequency towards the tested radar detector. Referring to the FIG. 2 embodiment in which closing of switch 25 activates the transmission of frequency from all three oscillators 21, 22 and 23. The user can simply manually close the switch 25. Switch 25 can be and internal switch and connected by conventional linkage to another separate external switch, however this would be more expensive and, therefore, is less desirable. With this apparatus and testing method, a single switch 25 can be used in conjunction with rotation of the sections 11, 12 and 13 in the housing of the transmitter apparatus 1 to provide selective directional radiation of radio frequency of a signal [at least two different signals] at a radar detector, such as the radar detector 2. When the switch 25 is closed, all three oscillators transmit frequency. The user physically rotates the apparatus 1 and through one complete 360 degrees rotation of the apparatus, each frequency separately illuminates the radar detector 2.

In a preferred embodiment of the present invention illustrated in FIG. 1, there is shown the method of operating the transmitter apparatus 1 of the present invention. The operator of the transmitter apparatus 1 positions the housing 10 of the transmitter apparatus so as to transmit a desired electromagnetic signal of field strength that presently is no greater than 500 microvolts/meter at 3 meters to the police band radar detector 2 being tested, such that the apparatus remains proximal to the radar detector long enough to activate a visible alert 5 and an audible alert 4 of the radar detector. The transmitter apparatus 1 is then gradually moved in the direction depicted by arrow 6, away from the radar detector 2. The radar detector's loss of signal from the transmitter apparatus 1 will be apparent when the visual alert 5 and the audible alert 4 becomes deactivated. The distance along direction 6 between the apparatus 1 and the radar detector 2 serves as a distance standard for performance verification of a particular radar frequency. The transmitter apparatus 1 is again positioned proximal or adjacent to the radar detector 2 and rotated according to direction 3, until a different frequency 7, 8 and 9 is realized by the radar detector that is being tested. The procedure is repeated until all three radar bands have been tested.

This method thus includes a proximity measurement where the proximity of the radar detector 2 to the apparatus 1 indicates field strength sensitivity of the radar detector. This measurement is used as a standard in subsequent tests for verification of performance.

Figure 4:
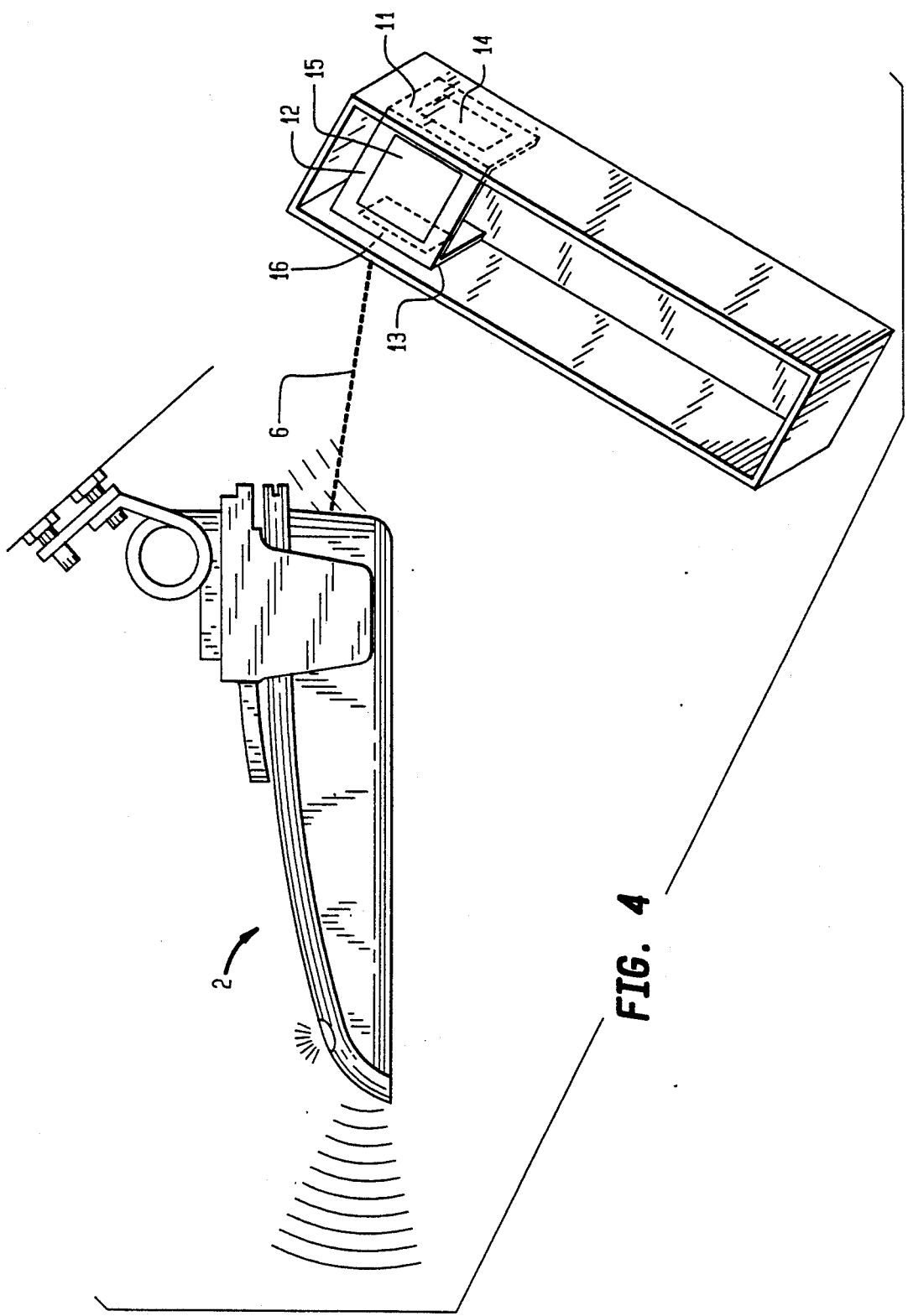
FIG. 4 is a diagrammatic illustration of the method used to measure transmission by the apparatus of FIG. 1.

As illustrated in FIG. 4, the orientation dependent frequency selection radiated from the two parallel sections or planes 11 and 13 and the one perpendicular plane 12, that correspond to surfaces 14, 16 and 15, respectively, generate a response from the radar detector 2. The distance 6 is increased until radar detector 2 no longer indicates signal presence. The distance 6 at this point will correspond directly to the minimum signal strength with which the radar detector 2 recognizes the transmitter apparatus 1. Any variation in the distance 6 indicates a change in performance of the radar detector 2.

Figure 5:
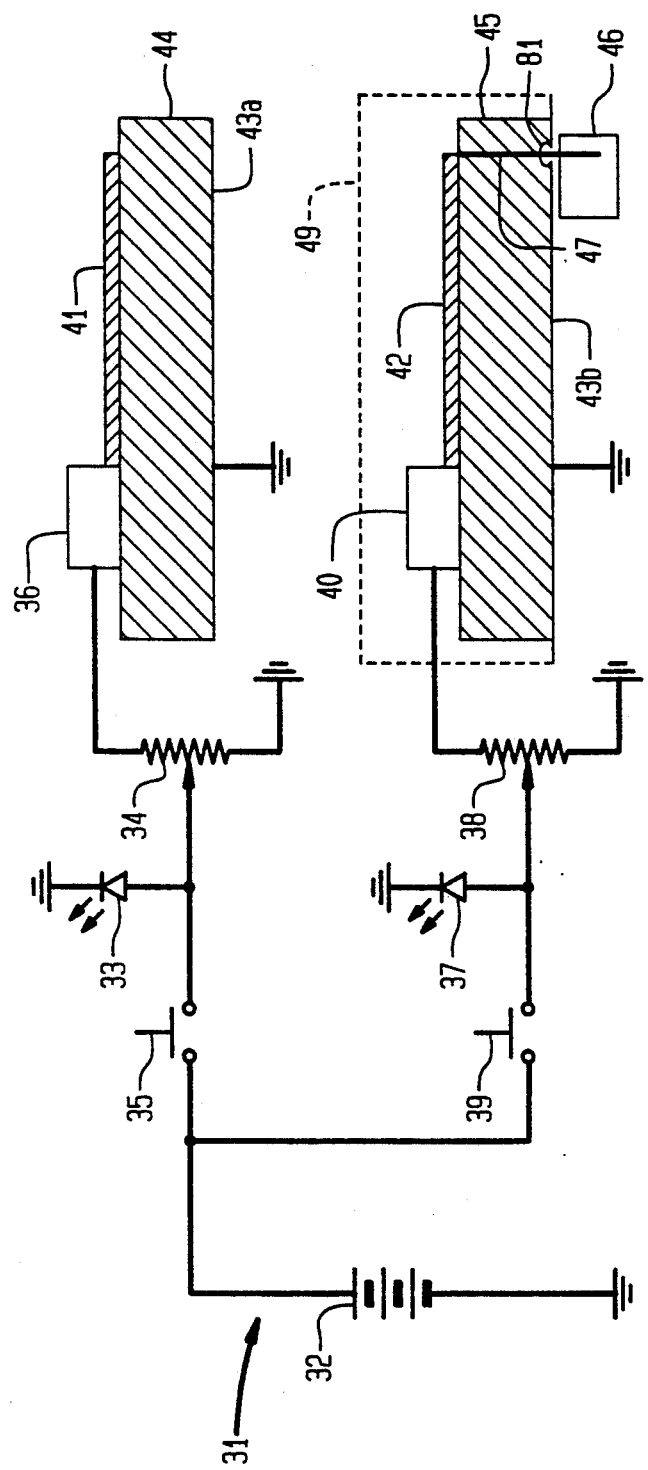
FIG. 5 is a cross-sectional view of a first alternative embodiment of the apparatus of the present invention.
Figure 6:
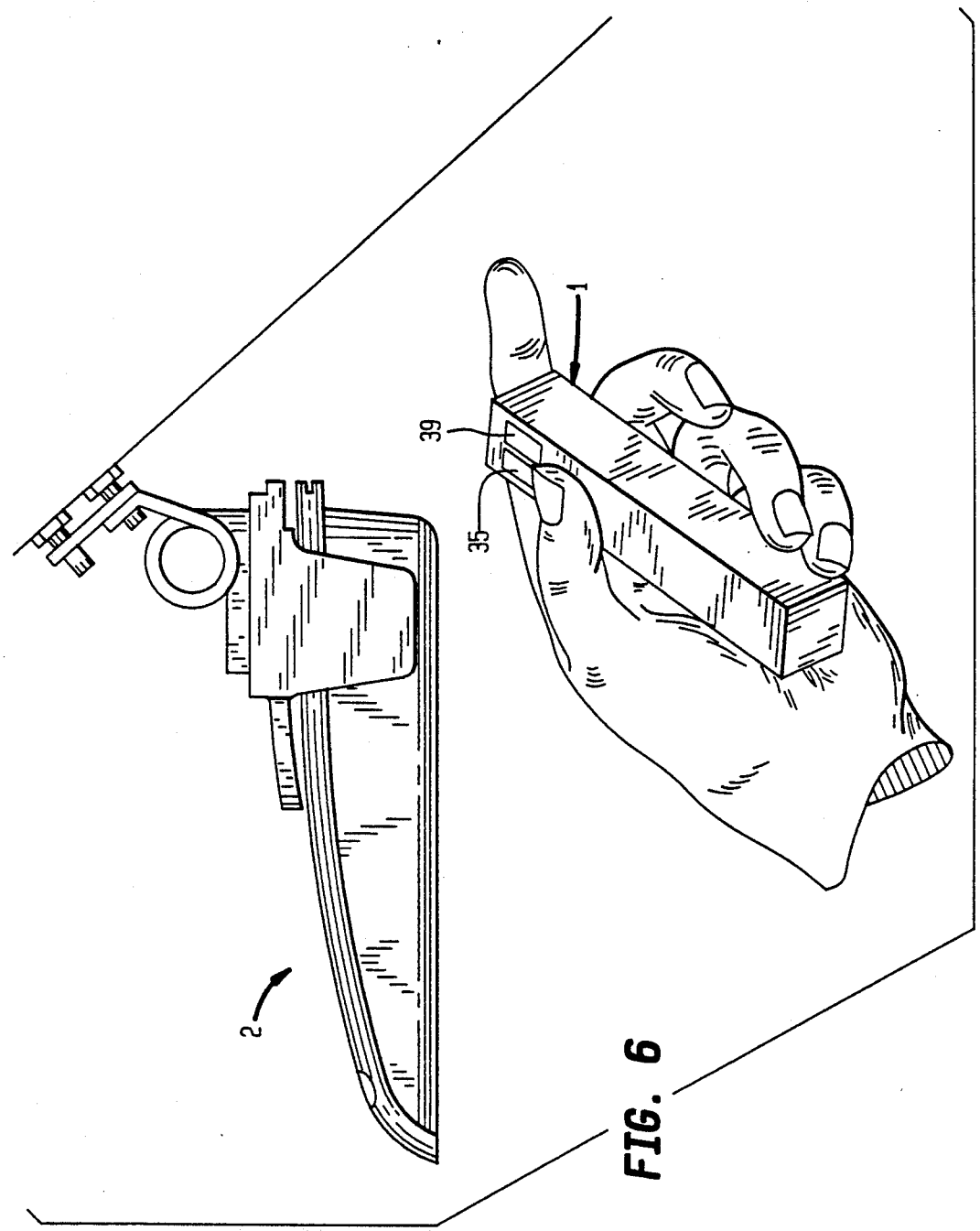
FIG. 6 is an exploded view of the first alternative embodiment and method for transmission according to the present invention.

FIG. 5 is one alterative embodiment of the transmitter of the present invention. A switch-selectable frequency transmitter apparatus 31 is provided that includes a two oscillators, potentiometers and switches and, preferably, two indicators. This transmitter apparatus 31 is used to measure a radar detector that has two bands, namely the X and K bands. The voltage is supplied from a power supply 32, which is any conventional DC or AC power supply, to a first switch 35 and a second switch 39. The voltage passes, when the first switch 35 is closed, to a first voltage indicator 33 and a first potentiometer 34. The first potentiometer 34 supplies voltage to a first oscillator 36. Similarly, the voltage is supplied from the power supply 32 to the second switch 39, when the second switch is closed, passes to a second voltage indicator 37 and a second potentiometer 38. The second potentiometer 38 supplies voltage to a second oscillator 40. In this embodiment, the first oscillator 36 provides frequency for the X band of the radar detector 2, while the second oscillator 40 provides frequency for the K band of the radar detector. The switches 35 and 39 are closed by manual activation of the switches as shown in FIG. 6. Thus, the selection of the frequency, namely X or K band, in the transmitter apparatus 31 is achieved by the activation of the particular external switches.

The first potentiometer 34 and the second potentiometer 38 allow separate adjustment of each oscillator's transmitted power output. The potentiometers 34, 38 are adjusted for applications where regulatory policies may differ but are not necessary for the operation of the transmitter apparatus 31. The outputs of the at least two oscillators 36 and 40 are operatively connected to a first conductive foil or foil strip 41 and a second conductive foil or foil strip 42, respectively. Each of the first and second foils 41 and 42 are fixed opposite to an electrical ground plane, namely ground planes 43a and 43b, respectively, and are separated from the ground planes by an electric non-conductor material, namely dielectrics 44 and 45, respectively. Thus, the components are operatively connected by an electromagnetic field, and not by a direct current (D.C.) since no direct current will flow through the dielectric material. The configuration of the foil, the dielectric and the ground plane in which the dielectric separates the foil and the ground plane is well known in high frequency circuits as a microstrip.

The foils 41 and 42 are, preferably, made of copper or any other conductive material. The dielectrics 44 and 45 are made of an insulating material, such as tetrafluroethylene sold under the mark Teflon by DuPont. The microstrip, that includes the foil 41, the dielectric 44 and the ground plane 43a, may be etched from commercially available circuit board that includes a suitable dielectric material. Alternatively, the foil 41 may also be applied with adhesive to a suitable dielectric material.

The transmitter apparatus 31 exploits transmission line effects seen in electromagnetic wave transmission media and exhibits properties similar to those found in coaxial cable.

Figure 5A:
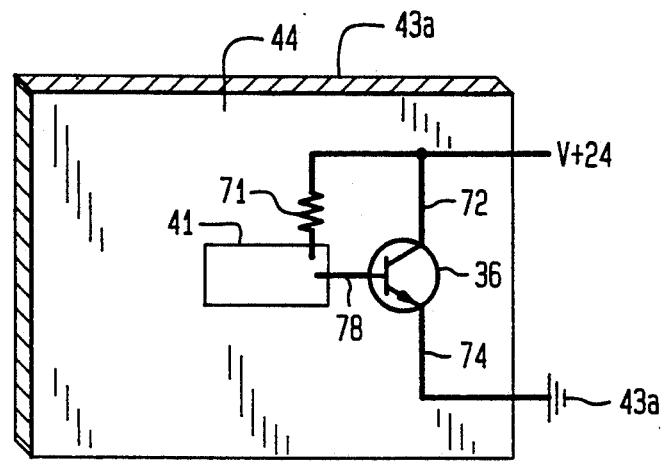
FIG. 5A is an exploded top view of the X band oscillator of FIG. 5.

FIG. 5A illustrates the oscillator 36 for the X band. The oscillator 36 is a single transistor. The collector 72 of the transistor 36 is connected to the positive voltage supply 24. The emitter 74, is connected to the ground plane 43a. A base lead 78 of the transistor 36 is connected to the foil 41 of the microstrip. A resistor 71 is electrically connected to the positive voltage supply 24 and the foil 41. The resistor 71 limits the base current of the oscillator or transistor 36. The foil 41, again, is separated from the ground plane 43a by the dielectric material 44.

Referring to FIG. 5, each conductive foil and its respective ground plane represent two conductors separated by a dielectric. With respect to electromagnetic waves propagating along the conductive foil, the arrangement exhibits capacitance, while the rising and collapsing magnetic field associated with wave propagation results in a series induction. The conductive foils 41 and 42 over the ground planes 43a and 43b arrangement comprise a tuned circuit that supports the oscillation by the oscillators 36 and 40 of the apparatus 31. The foil 41, supported by the dielectric 44, and opposed to the ground plane 43a, is operatively connected to the first oscillator 36. The foil 41 is dimensioned such that the resonant frequency supported will cause a response in the X band radar frequency of the radar detector 2 either from harmonics developed or a fundamental frequency within the radar detector's X band. For example, a frequency of 5.26 GHz from the transmitter 1 may be multiplied to 10,525 GHz within the radar detector's detecting circuitry (i.e. a diode mounted within the receiver's resonating cavity that is found in all radar detectors) similar to the generation of harmonics that would occur if the transmitter apparatus comprises a diode coupled to the oscillator. This is also true for the K and Ka bands. The technique of harmonic generation utilizing the radar detector's components would enable the transmitter to comprise less expensive components associated with lower frequency devices.

For example, according to FIG. 5, the first oscillator 36 is oscillating at a frequency of 5.26 GHz. The power supply to the first oscillator 36 is regulated by the first potentiometer 34 to adjust the transmitted power output of the transmitted frequency so the frequency of greatest field strength, or 5.26 GHz, is no greater than 500 uV/Meter at 3 meters, e.g. within present regulatory limits. With an operating frequency of 5.26 GHz, the transmitter apparatus 31 will activate a radar detector's X band alert by the harmonic generated at 10.52 GHz. The harmonic may be generated within the receiving section of the radar detector or the harmonic may be generated outside the radar detector.

Referring to the second oscillator 40 of FIG. 5, the microstrip, that includes the foil 42, the dielectric 45 and the ground plane 43b, is coupled to waveguide 46 via a probe 47. The probe 47 is operatively connected to the foil 42 by inserting the probe through the dielectric 45. The probe 47 passes through a conductor-less etched path 81 in the ground plane 43b of the circuit board. The probe 47 may be a piece of conductor or, alternatively, a high frequency diode may be implemented. The diode would act as a harmonic generator to increase the efficiency of harmonic generation.

A waveguide 46 is a conductive chamber electrically connected to the ground plane 43b of dimensions such that frequencies corresponding to those in the second or K radar band are not attenuated. Those skilled in the art will appreciate that the waveguide may be dimensionally partial to frequencies of the Ka radar band. For example, the second oscillator 40 and the second microstrip comprise a tuned circuit that is tuned to a frequency of 8.05 GHz. A conductive shield 49 completely envelopes the oscillator 40 and the microstrip, and is electrically connected to the ground plane 43b. The shield 49 prevents any outside indication of the 8.05 GHz frequency that is generated within its boundaries. The radio frequency energy is, according to the present invention, transferred to the waveguide 46 via the probe 47.

Figure 5B:
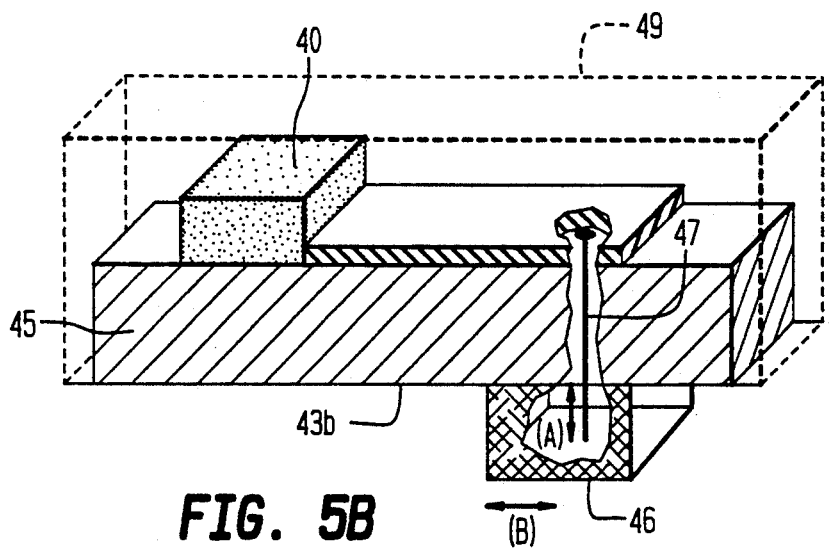
FIG. 5B is an exploded cross-sectional view of the second dielectric of the K band oscillator of FIG. 5.

Referring to FIG. 5B, the probe 47 passes through the dielectric 45 without electrical connection to the ground plane 43b. It is positioned ¼ wavelength (A) of the desired radar band frequency within the waveguide 46 and ¼ wavelength (B) of the desired radar band frequency away from the closed end of the waveguide. The waveguide 46 comprises a conductive material on each of five inner faces of the cavity. The inner dimensions of the waveguide 46 are 0.17 inches high and 0.42 inches wide to support frequencies from 18 to 26.5 GHz.

A waveguide with dimensions 0.17 inches high and 0.34 inches wide may also be used. It will support frequencies from 22 to 33 GHz. With the center frequency of the K band at 24.150 GHz, either waveguide will support the proper frequency. In addition, the Ka band may also be supported by the transmitter apparatus 31 utilizing a waveguide with dimensions 0.112 inch by 0.224 inch (33-50 GHz). In an alternative embodiment, the transmitter apparatus 31 may employ the use of circular waveguides of inside diameter from 0.219 to 0.438 inches.

The test transmitter apparatus 31 can be modified to test for the K and Ka bands. The K or Ka bands radar detector test transmitter apparatus utilizes the tuned 8.05 GHz frequency. It has ample shielding 49 so the signal of the 8.05 GHz frequency is undetectable. A harmonic at 24.150 GHz propagates through the waveguide, while the lesser harmonics and the signal from the 8.05 GHz tuned or fundamental frequency, which is below the cut-off frequency supported by the dimensions of the waveguide, are attenuated. Power output is adjusted via potentiometer 38 to be no greater than 250 mV/Meter at 3 meters in the K band or within regulatory guidelines.

Referring to FIG. 6, the operator of the present transmitter apparatus 31 positions the hand-held electromagnetic field apparatus to the receiving section of the radar detector 2 that is being tested and depresses a first switch 35, which in the shown preferred embodiment is positioned through the exterior surface of the apparatus 31, that is connected by conventional means to the first oscillator 36 shown in FIG. 5. The signal transmitted causes the radar detector 2 to generate a response in the X band radar frequency. Similarly, when a second switch 39 (which also preferably is an exterior switch), that is operatively connected by conventional means to oscillator 40 also shown in FIG. 5, is depressed, the radar detector 2 generates a response in the K (or Ka) radar band. This method and apparatus enables the operator of the invention to test the receiver section and alerting circuitry of a police radar detector.

An application for the present invention as a novelty item is possible due to the power output levels allowed by regulatory guidelines for the K radar band. Since power output levels must be no greater than 250 mV/Meter a 3 meters in the K band, an operator of the present transmitter apparatus may set off a radar detector response in the K band of an in-use radar detector thereby causing the owner of the radar detector to respond to the K band warning signal.

Figure 7:
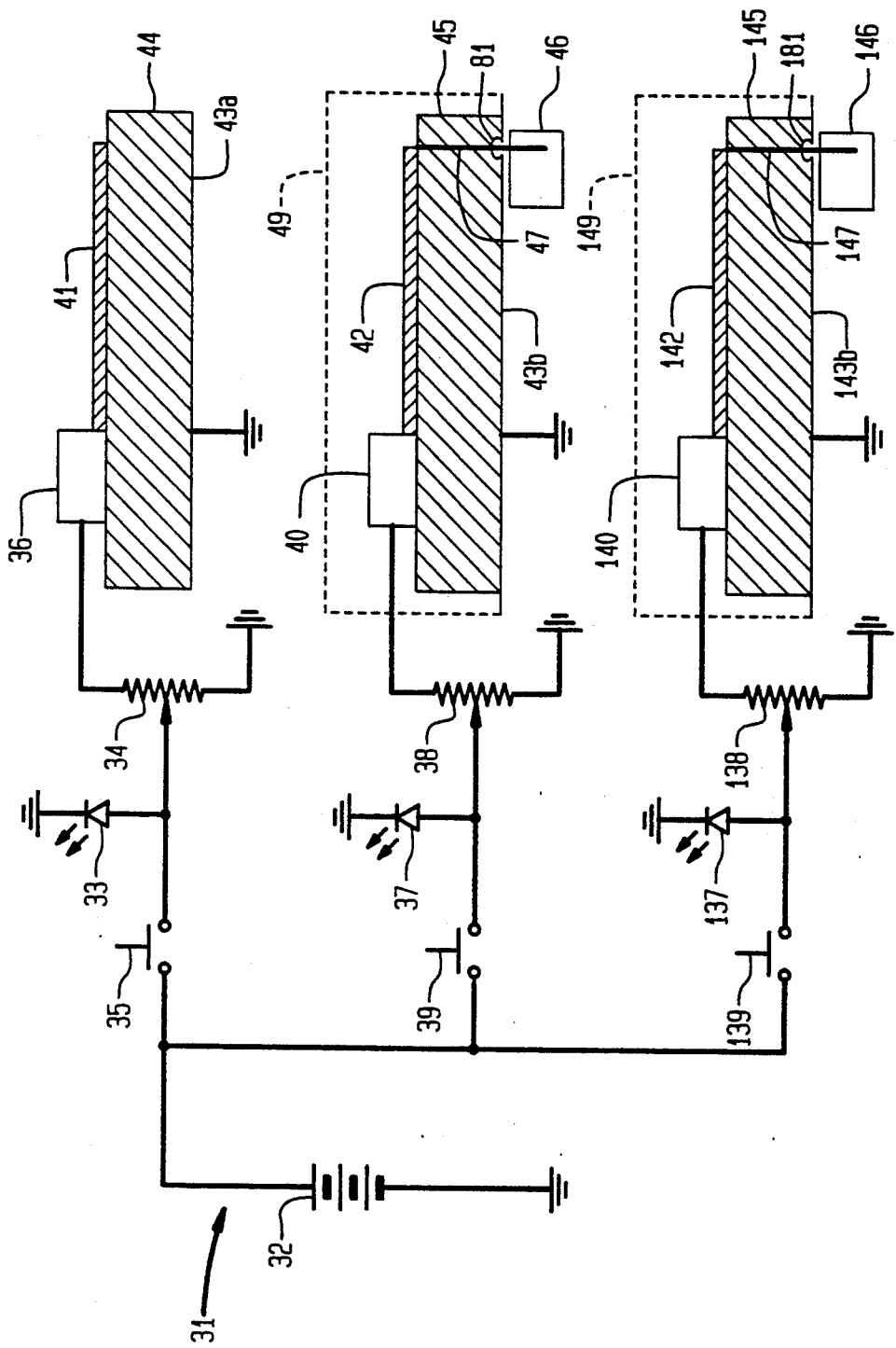
FIG. 7 is a cross-sectional view of a second alternative embodiment of the apparatus of the present invention.

The switch-selectable transmitter 31 can readily be modified to test for the three bands, namely X, K and Ka, of a radar detector by the including a third switch and, more importantly, a third oscillator, potentiometer and, preferably, indicator. This transmitter is shown in FIG. 7 would be analogous to the two band transmitter of FIG. 5, except a third leg, namely a third switch 139, a third voltage indicator 137, a third potentiometer 138, a third oscillator 140, and a third microstrip that includes the conductive foil 142, the dielectric 145 and the ground plane 143b, provide for the Ka band. There is also provided a shield 149 that is the same as shield 49 to keep undesirable frequencies and spurious emissions from being emitted from the apparatus 31. This third leg may also include a probe 147 and a waveguide 146. Again, the third switch 139 is preferably positioned through the exterior surface of the apparatus 31.

Figure 8:
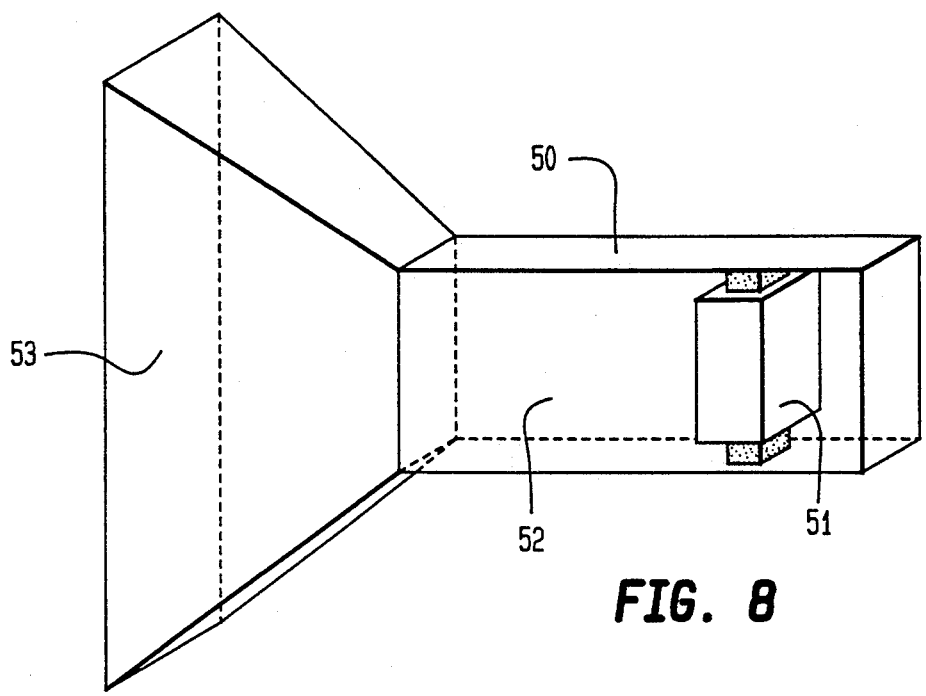
FIG. 8 is an exploded view of a third alternative embodiment of the apparatus of the present invention.

Referring now to FIG. 8, an alternative transmitter apparatus 50 provides an alternate means for generating signals within police radar bands. A gunn diode 51 mounted in oscillator cavity 52 of microwave horn 53 is capable of transmitting signals within the X, K and Ka radar bands. However, since it is within the spirit of the invention to utilize components of least cost to generate high frequency in the X, K and Ka radar bands, the transmitter apparatus 50 is a less preferred means for generating these high-frequency signals.

Figure 9:
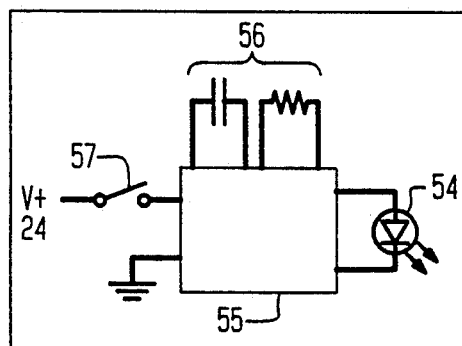
FIG. 9 illustrates a laser enhancement feature of the apparatus and its positioning in the apparatus of FIGS. 1, 5 and 7.
Figure 9:
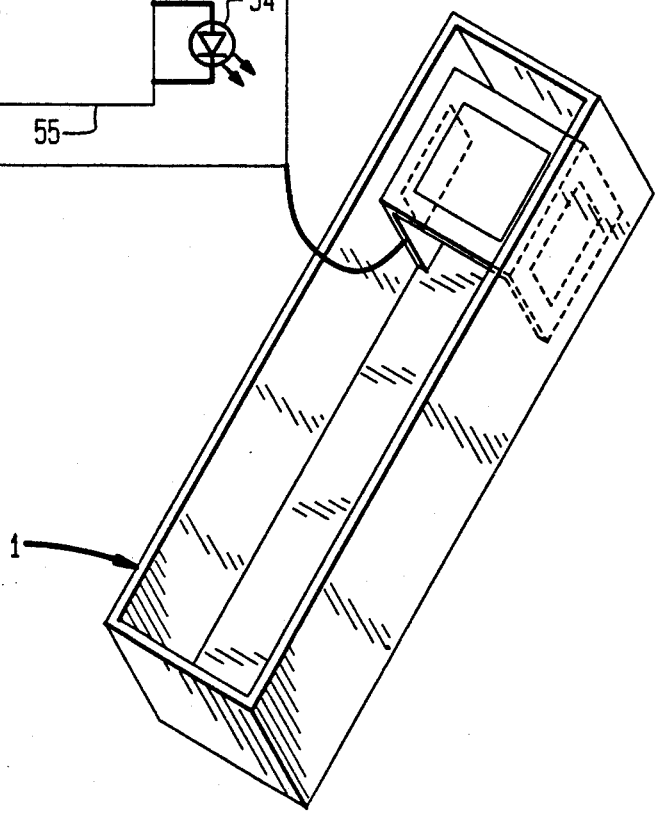

Another alternative embodiment of the present invention is shown in FIG. 9. Recently, speed measurement devices include light detection and ranging (LIDAR) equipment to determine the speed of an automobile. FIG. 9 depicts an enhancement of the present invention, namely a circuit diagram of a LIDAR detector tester that may be incorporated into transmitter apparatus 1 and 31 of FIGS. 1, 4, 5 and 7.

The LIDAR detector tester of the transmitter apparatus 1 and 31 comprises an infrared light emitting diode 54 that is pulsed corresponding to a pulse rate to activate the laser detector's alert circuitry. The pulse rate is controlled by pulsing circuit 55. The time constant for the pulsing circuit is controlled by timing circuit 56 comprised of a resistor and a capacitor. The circuit is energized by switch 57 that is connected to the power supply 24 of the transmitter apparatus 1 and 31. The switch 57 is another manually operated switch that, again, in a preferred embodiment, is a switch positioned through the exterior surface of the transmitter 1 or 31. Accordingly, in the transmitter apparatus 1 of FIG. 1, switch 57 is a second switch. In the transmitter apparatus 31 of FIG. 5 (the two band apparatus) it is a third switch, while in the transmitter apparatus 31 of FIG. 7 (the three band apparatus), it is a fourth switch.

Although a particular embodiment of the present invention has been described and illustrated herein, it is recognized that modifications, variations, and alternate embodiments may readily be made by those of ordinary skill in the art without modifications and equivalents to the preferred embodiment are covered by the appended claims.

Wherefore we claim:

1. An apparatus for testing a radar detector, said apparatus comprising:
   a housing having three sections each with an outer surface and an inner surface, the three sections being configured so that the outer surfaces of each is directed away from the other two surfaces;
   three frequency transmitters each mounted on a different one of the three sections of the housing;
   means for receiving voltage from a voltage source to power the three transmitters;
   voltage indicator means for monitoring voltage of the energy source; and
   switch means for connecting the voltage indicator means and the transmitters to the voltage receiving means,
   wherein each section acts to shield the housing from the frequency from each of the three transmitters.

2. The apparatus according to claim 1, wherein two of the three sections are parallel to but spaced from each other, and wherein the third section is positioned perpendicular to the two sections to form a U-shape.

3. The apparatus according to claim 1, wherein the three sections are formed on one substrate.

4. The apparatus according to claim 1, wherein the three sections are configured to form an equilateral triangle.

5. The apparatus according to claim 1, wherein each section has an outer surface that directs radio frequency energy away from that section and, thus, away from the other two outer surfaces.

6. The apparatus according to claim 5, wherein each outer surface of each section includes an oscillator and an antennae.

7. The apparatus according to claim 6, wherein each section includes an amplifier.

8. The apparatus according to claim 1, wherein each section has an inner surface that acts to shield the housing from the frequency from each of the three transmitters.

9. The apparatus according to claim 1, further comprising a voltage indicator.

10. The apparatus according to claim 9, wherein the voltage indicator includes a light emitting diode.

11. The apparatus according to claim 1, wherein each section has a conductive covering that provides shielded planes for each frequency transmitted so that as the apparatus is rotated the apparatus shields two transmitted frequencies from the radar detector while directing one frequency towards the radar detector.

12. The apparatus according to claim 1, further comprising means for selective directional radiation of radio frequency of a signal at the radar detector.

13. The apparatus according to claim 12, wherein the radiation means is a means for rotating the three sections.

14. The apparatus according to claim 1, wherein the switch means is an external switch operatively connected to the voltage indicator means, the three frequency transmitters and the voltage receiving means.

15. A switch-selectable frequency transmitter apparatus comprising:
   means for supplying voltage;
   a plurality of switches each operatively connected to the voltage supplying means;
   a plurality of indicators each operatively connected to a different one of the plurality of switches;
   a plurality of potentiometers each operatively connected to a different one of the plurality of indicators;
   a plurality of oscillators each operatively connected to a different one of the plurality of potentiometers, wherein each potentiometer supplies voltage to its respective oscillator; and
   a plurality of microstrips each operatively connected to a different one of the plurality of oscillators.

16. The apparatus according to claim 15, wherein the voltage supplying means is a DC or AC power supply.

17. The apparatus according to claim 15, wherein each of the plurality of microstrips includes a conductive foil strip operatively connected to one of the plurality of oscillators, an electrical non-conductive material having a first side and an opposite second side with the foil strip physically connected the first side, and an electrical ground plane physically attached to the second side of the electrical non-conductive material.

18. The apparatus according to claim 17, wherein the conductive foil strip is made of copper.

19. The apparatus according to claim 17, wherein the electrical non-conductive material is a dielectric.

20. The apparatus according to claim 19, wherein the dielectric is made of tetrafluroethylene.

21. The apparatus according to claim 17, wherein the conductive foil and the non-conductive material form a circuit board.

22. The apparatus according to claim 15, wherein each of the plurality of oscillators is a transistor.

23. The apparatus according to claim 22, wherein at least one transistor includes a collector that is connected to the voltage supplying means.

24. The apparatus according to claim 23, further comprising an emitter that is connected to the one of the plurality of ground planes operatively connected to the at least one transistor.

25. The apparatus according to claim 17, further comprising a resistor that is electrically connected to the voltage supplying means and one of the plurality of conductive foils to limit the base current of the respective oscillator.

26. The apparatus according to claim 17, wherein the plurality of conductive foils over the plurality of ground planes arrangement comprise a tuned circuit that supports the oscillation by the plurality of oscillators.

27. The apparatus according to claim 25, further comprising at least one conductive shield that completely envelopes one of the plurality of oscillators and the respective one of the plurality of microstrips.

28. The apparatus according to claim 27, wherein the at least one conductive shield is electrically connected to the respective one of the plurality of ground planes.

29. The apparatus according to claim 17, wherein one of the plurality of oscillators and its respective one of the plurality of microstrips is coupled to a waveguide by a probe.

30. The apparatus according to claim 29, wherein the probe is operatively connected to the conductive foil of the microstrip by inserting the probe through the electric non-conductive material of the microstrip.

31. The apparatus according to claim 30, wherein the probe passes through a conductor-less etched path of the ground plane.

32. The apparatus according to claim 30, wherein the probe passes without electrical contact through the ground plane.

33. The apparatus according to claim 29, wherein the probe is a conductor.

34. The apparatus according to claim 29, wherein the probe is a diode.

35. The apparatus according to claim 29, wherein the waveguide is a conductive chamber electrically connected to the respective one of the plurality of ground planes.

36. The apparatus according to claim 15, wherein one of the plurality of switches is an external switch that causes the apparatus to generate a response from a radar detector in the X band.

37. The apparatus according to claim 15, wherein the plurality of switches are a pair of external switches and the plurality of indicators are a pair of indicators each operatively connected to a different one of the pair of external switches, and wherein the plurality of potentiometers are a pair of potentiometers each operatively connected to a different one of the pair of indicators, and wherein the plurality of oscillators are a pair of oscillators each operatively connected to a different one of the pair of potentiometers, and wherein the plurality of microstrips are a pair of microstrips each operatively connected to a different one of the pair of oscillators, whereby two bands of the radar detector can be tested.

38. The apparatus according to claim 37, wherein each external switch causes the apparatus to selectively generate a response from a desired one of two bands in the radar detector.

39. The apparatus according to claim 15, wherein the plurality of switches are three external switches and the plurality of indicators are three indicators each operatively connected to a different one of the three external switches, and wherein the plurality of potentiometers are three potentiometers each operatively connected to a different one of the three indicators, and wherein the plurality of oscillators are three oscillators each operatively connected to a different one of the three potentiometers, and wherein the plurality of microstrips are three microstrips each operatively connected to a different one of the three oscillators, whereby three bands of the radar detector can be tested.

40. The apparatus according to claim 39, wherein each one of the three external switches causes the apparatus to selectively generate a response from a desired one of three bands in the radar detector.

41. The apparatus according to claim 1, further comprising a laser detector tester.

42. The apparatus according to claim 41, wherein the laser detector tester includes an infrared light emitting diode that is pulsed corresponding to a pulse rate to activate the alert circuitry of a laser detector.

43. The apparatus according to claim 42, wherein the laser detector tester has means for controlling the pulse rate.

44. The apparatus according to claim 43, wherein the controlling mean is a pulsing circuit.

45. The apparatus according to claim 44, wherein the pulsing circuit includes a timing circuit for controlling the time constant.

46. The apparatus according to claim 45, wherein the timing circuit includes a resistor and a capacitor.

47. The apparatus according to claim 45, wherein the timing circuit is energized by a switch that is connected to the means for receiving voltage.

48. A method to verify the performance of a police band radar detector comprising the steps of:

positioning an electromagnetic field transmitter having a plurality of oscillators adjacent but spaced apart from the radar detector;

transmitting a desired electromagnetic signal of field strength from a transmitter to the radar detector;

moving the position of the transmitter to a distal location from the radar detector until there is a loss of signal that inactivates an alert circuitry in the radar detector;

utilizing the distal location as a distance standard for performance of the radar detector; and means for selectively energizing the plurality of oscillators of the transmitter to detect the desired band at the radar detector.

49. The method according to claim 48, wherein the energizing means is a plurality of switches.

50. The method according to claim 49, wherein each one of the plurality of switches energizes a different one of the plurality of oscillators in the transmitter.

* * * * *